(12) United States Patent
Marten

(10) Patent No.: US 11,758,245 B2
(45) Date of Patent: Sep. 12, 2023

(54) INTERACTIVE MEDIA EVENTS

(71) Applicant: DISH Network L.L.C., Englewood, CO (US)

(72) Inventor: Neil Marten, Lakewood, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 17/376,459

(22) Filed: Jul. 15, 2021

(65) Prior Publication Data
US 2023/0014831 A1    Jan. 19, 2023

(51) Int. Cl.
*H04N 21/8545* (2011.01)
*H04N 21/442* (2011.01)
*H04N 21/845* (2011.01)
*H04N 21/43* (2011.01)

(52) U.S. Cl.
CPC ..... *H04N 21/8545* (2013.01); *H04N 21/4307* (2013.01); *H04N 21/44218* (2013.01); *H04N 21/8456* (2013.01)

(58) Field of Classification Search
None
See application file for complete search history.

(56) References Cited

U.S. PATENT DOCUMENTS

| | | | |
|---|---|---|---|
| 6,081,830 A | 6/2000 | Schindler | |
| 6,237,025 B1 | 5/2001 | Ludwig et al. | |
| 6,256,663 B1 | 7/2001 | Davis | |
| 6,392,664 B1 | 5/2002 | White et al. | |
| 6,519,771 B1 | 2/2003 | Zenith | |
| 6,643,291 B1 | 11/2003 | Yoshihara | |
| 6,646,673 B2 | 11/2003 | Caviedes et al. | |

(Continued)

FOREIGN PATENT DOCUMENTS

| | | |
|---|---|---|
| CN | 103290360 B | 3/2016 |
| CN | 110430457 A | 11/2019 |

OTHER PUBLICATIONS

A. Colaco, I. Kim and C. Schmandt, "Back Talk: An auditory environment for sociable television viewing," 2011 IEEE Consumer Communications and Networking Conference (CCNC), 2011, pp. 352-356, doi: 10.1109/CCNC.2011.5766489. (Year: 2011).

(Continued)

*Primary Examiner* — Alexander Q Huerta
(74) *Attorney, Agent, or Firm* — Wash Park IP Ltd.; John T Kennedy

(57) ABSTRACT

An Interactive Media Event (IME) system includes a sync server, a first user device, and a second user device, each device is coupled to the server. The server executes computer instructions instantiating a content segment engine which outputs a Party matter to the second user device and instantiates an IME engine which receives, from the second user device, a later reaction to the Party matter. The IME engine synchronizes the later reaction with the Party matter. The Party matter may include a media event and a prior reaction to the media event received from the first user device. The media event includes a primary content segment and synchronization information associated therewith. The prior reaction and/or the later reaction may be synchronized to the primary content segment and/or to each other using the synchronization information. A reaction may include chat data captured during the Party.

20 Claims, 2 Drawing Sheets

(56) References Cited

U.S. PATENT DOCUMENTS

| | | |
|---|---|---|
| 6,754,904 B1 | 6/2004 | Cooper et al. |
| 7,143,428 B1 | 11/2006 | Bruck et al. |
| 8,015,306 B2 | 9/2011 | Bowman |
| 8,046,411 B2 | 10/2011 | Hayashi et al. |
| 8,223,185 B2 | 7/2012 | Gratton et al. |
| 8,316,400 B1 | 11/2012 | Kravets |
| 9,015,306 B2 | 4/2015 | Dupre et al. |
| 9,226,011 B2 | 12/2015 | Francisco |
| 9,252,950 B2 | 2/2016 | Caspi |
| 9,378,474 B1 | 6/2016 | Story |
| 9,471,809 B2 | 10/2016 | Garrett et al. |
| 9,544,624 B2 | 1/2017 | VanDuyn et al. |
| 9,654,817 B2 | 5/2017 | Li et al. |
| 10,135,887 B1 | 11/2018 | Esser |
| 10,187,690 B1 | 1/2019 | Garcia et al. |
| 10,237,587 B2 | 3/2019 | Zanabria et al. |
| 10,536,741 B1 | 1/2020 | Madison et al. |
| 10,575,042 B2 | 2/2020 | Rennison et al. |
| 10,735,825 B1 | 8/2020 | Comito et al. |
| 10,757,366 B1 | 8/2020 | Kwatra et al. |
| 10,757,467 B1 * | 8/2020 | Katz .................. H04L 65/401 |
| 10,819,758 B1 | 10/2020 | Krutsch et al. |
| 10,939,148 B2 | 3/2021 | Sun |
| 11,019,113 B2 | 5/2021 | Kurata et al. |
| 11,051,059 B2 | 6/2021 | Dodson et al. |
| 11,082,467 B1 | 8/2021 | Hartnett et al. |
| 11,128,916 B2 | 9/2021 | Mayhew et al. |
| 11,166,065 B1 | 11/2021 | Camargo et al. |
| 11,303,947 B2 | 4/2022 | Bertolami et al. |
| 11,477,516 B2 | 10/2022 | Yoden |
| 11,502,864 B2 | 11/2022 | Moorefield et al. |
| 11,509,726 B2 | 11/2022 | Alsina et al. |
| 11,553,159 B1 | 1/2023 | Rothschild et al. |
| 11,588,869 B2 | 2/2023 | Gratton et al. |
| 11,606,597 B2 | 3/2023 | Iyer et al. |
| 2002/0067909 A1 | 6/2002 | Iivonen |
| 2003/0009766 A1 | 1/2003 | Marolda |
| 2003/0097655 A1 | 5/2003 | Novak |
| 2003/0229900 A1 | 12/2003 | Reisman |
| 2004/0154040 A1 | 8/2004 | Ellis |
| 2004/0025811 A1 | 10/2004 | Grandy et al. |
| 2005/0204387 A1 | 9/2005 | Knudson |
| 2005/0262542 A1 | 11/2005 | Deweese et al. |
| 2006/0009766 A1 | 1/2006 | Lee et al. |
| 2006/0010102 A1 | 1/2006 | Labossiere et al. |
| 2006/0101022 A1 | 5/2006 | Yu et al. |
| 2006/0149850 A1 | 7/2006 | Bowman |
| 2006/0161621 A1 | 7/2006 | Rosenberg |
| 2006/0174312 A1 | 8/2006 | Ducheneaut et al. |
| 2006/0236352 A1 * | 10/2006 | Scott, III ................ H04N 5/76 |
| | | 348/E7.071 |
| 2006/0271960 A1 | 11/2006 | Jacoby et al. |
| 2007/0157281 A1 | 7/2007 | Ellis et al. |
| 2007/0229651 A1 | 10/2007 | Nakajima |
| 2007/0283380 A1 | 12/2007 | Aoki |
| 2008/0037785 A1 | 2/2008 | Gantman et al. |
| 2008/0163285 A1 | 7/2008 | Tanaka et al. |
| 2009/0063983 A1 | 3/2009 | Amidon |
| 2009/0089840 A1 | 4/2009 | Shusman |
| 2009/0167839 A1 | 7/2009 | Ottmar |
| 2009/0205008 A1 * | 8/2009 | Wollmershauser .......................... H04N 21/43615 |
| | | 725/110 |
| 2009/0319885 A1 * | 12/2009 | Amento ................ G06Q 10/10 |
| | | 715/230 |
| 2009/0327428 A1 | 12/2009 | Ramanathan |
| 2010/0066804 A1 | 3/2010 | Shoemake et al. |
| 2010/0281108 A1 | 11/2010 | Cohen |
| 2010/0306671 A1 | 12/2010 | Mattingly et al. |
| 2011/0016172 A1 * | 1/2011 | Shah .................. H04N 21/439 |
| | | 707/723 |
| 2011/0069940 A1 | 3/2011 | Shimy et al. |
| 2011/0154417 A1 * | 6/2011 | Civanlar ................ H04N 7/15 |
| | | 725/105 |
| 2011/0219307 A1 | 9/2011 | Mate |
| 2011/0246908 A1 | 10/2011 | Akram |
| 2012/0131110 A1 | 5/2012 | Buyukkoc et al. |
| 2012/0151345 A1 * | 6/2012 | McClements, IV ... G06Q 50/01 |
| | | 715/716 |
| 2012/0216300 A1 | 8/2012 | Vivolo et al. |
| 2012/0218262 A1 | 8/2012 | Yomdin et al. |
| 2012/0246679 A1 | 9/2012 | Chen |
| 2012/0296972 A1 * | 11/2012 | Backer .................. G06F 3/0481 |
| | | 709/204 |
| 2013/0016955 A1 * | 1/2013 | Pejaver ................ H04N 21/242 |
| | | 386/E9.011 |
| 2013/0031192 A1 | 1/2013 | Caspi |
| 2013/0103814 A1 | 4/2013 | Carrasco et al. |
| 2013/0173765 A1 | 7/2013 | Korbecki |
| 2014/0068692 A1 | 3/2014 | Archibong et al. |
| 2014/0071344 A1 | 3/2014 | Francisco |
| 2014/0096167 A1 * | 4/2014 | Lang .................. H04N 21/4788 |
| | | 725/91 |
| 2014/0150002 A1 | 5/2014 | Hough et al. |
| 2014/0195675 A1 | 7/2014 | Silver |
| 2014/0269757 A1 | 9/2014 | Park et al. |
| 2014/0325557 A1 | 10/2014 | Evans et al. |
| 2015/0052571 A1 | 2/2015 | Stokking et al. |
| 2015/0106360 A1 | 4/2015 | Cao |
| 2015/0172338 A1 | 6/2015 | Moran et al. |
| 2015/0215352 A1 * | 7/2015 | Wong ...................... H04L 67/02 |
| | | 709/204 |
| 2015/0230004 A1 | 8/2015 | VanDuyn et al. |
| 2015/0245106 A1 | 8/2015 | Tian |
| 2015/0327024 A1 | 11/2015 | Yang et al. |
| 2016/0006981 A1 | 1/2016 | Bauman et al. |
| 2016/0044622 A1 * | 2/2016 | Crowe ............ H04N 21/43076 |
| | | 709/231 |
| 2016/0050160 A1 | 2/2016 | Li et al. |
| 2016/0182928 A1 * | 6/2016 | Francisco .......... H04N 21/4302 |
| | | 725/116 |
| 2016/0255041 A1 | 9/2016 | Lew |
| 2016/0294894 A1 | 10/2016 | Miller |
| 2016/0366203 A1 | 12/2016 | Blong et al. |
| 2017/0006322 A1 | 1/2017 | Dury et al. |
| 2017/0093769 A1 | 3/2017 | Lind et al. |
| 2017/0103664 A1 | 4/2017 | Wong et al. |
| 2017/0264920 A1 | 9/2017 | Mickelsen |
| 2017/0312626 A1 | 11/2017 | Colenbrander |
| 2017/0346926 A1 | 11/2017 | Charters et al. |
| 2018/0035136 A1 | 2/2018 | Crowe |
| 2018/0167427 A1 | 6/2018 | Kedenburg, III |
| 2018/0192000 A1 | 7/2018 | Mercredi et al. |
| 2018/0288467 A1 | 10/2018 | Holmberg et al. |
| 2018/0316939 A1 | 11/2018 | Todd |
| 2018/0330756 A1 | 11/2018 | MacDonald |
| 2018/0365232 A1 | 12/2018 | Lewis |
| 2019/0124159 A1 | 4/2019 | Alsina et al. |
| 2019/0147841 A1 | 5/2019 | Zatepyakin et al. |
| 2019/0179610 A1 | 6/2019 | Aiken |
| 2019/0200054 A1 | 6/2019 | Dharmaji |
| 2019/0253742 A1 | 8/2019 | Garten et al. |
| 2019/0321720 A1 | 10/2019 | Nomura et al. |
| 2020/0029117 A1 | 1/2020 | Kalva et al. |
| 2020/0053312 A1 | 2/2020 | Mukherjee et al. |
| 2020/0112753 A1 | 4/2020 | Stockhammer et al. |
| 2020/0275149 A1 | 8/2020 | Su et al. |
| 2021/0001236 A1 | 1/2021 | Srinivasan |
| 2021/0006864 A1 | 1/2021 | Xu et al. |
| 2021/0035559 A1 | 2/2021 | Xu |
| 2021/0037295 A1 * | 2/2021 | Strickland .......... H04N 21/8133 |
| 2021/0051034 A1 | 2/2021 | Jonas et al. |
| 2021/0321159 A1 | 10/2021 | Aggarwal et al. |
| 2022/0040816 A1 | 2/2022 | Eckel et al. |
| 2022/0066621 A1 | 3/2022 | Appelbaum et al. |
| 2022/0103873 A1 | 3/2022 | Yoshida et al. |
| 2022/0132214 A1 * | 4/2022 | Felman .................. H04L 67/535 |
| 2022/0141500 A1 | 5/2022 | Du |
| 2022/0166815 A1 | 5/2022 | Gratton et al. |
| 2022/0174357 A1 | 6/2022 | Zavesky et al. |
| 2022/0256231 A1 | 8/2022 | Eniwumide |

(56) References Cited

U.S. PATENT DOCUMENTS

2022/0377413 A1 11/2022 Lidaka et al.
2022/0408161 A1 12/2022 Garten

OTHER PUBLICATIONS

U.S. Appl. No. 16/706,686, Application as filed Dec. 7, 2019.
U.S. Appl. No. 16/706,686, Non-Final Office Action, dated May 12, 2021.
U.S. Appl. No. 16/706,764, Application as filed Dec. 8, 2019.
U.S. Appl. No. 16/706,764, Non-Final Office Action, dated Jun. 10, 2021.
U.S. Appl. No. 16/801,277, Application as filed Feb. 26, 2020.
U.S. Appl. No. 17/087,815, Application as filed Nov. 3, 2020.
U.S. Appl. No. 17/336,416, Application as filed Jun. 2, 2021.
"Be anyone and reface anything"—downloaded from the Internet on Nov. 3, 2021 from https://hey.reface.ai/.
ATSC Standard: ATSC 3.0 System, Doc. A/300:2019, Sep. 17, 2019.
DeepFace Lab for Windows, downloaded from the Internet on Nov. 3, 2021 from https://deepfacelab.en.softonic.com/.
Faceswap, downloaded from the Internet on Nov. 3, 2021 from https://faceswap.dev/.
Family Fun with Deepfakes . . . , downloaded from the Internet on Oct. 23, 2021, from https://towardsdatascience.com/family-fun-with-deepfakes-or-how-i-got-my-wife-onto-the-tonight-show-a4554775c011.
PCT/IB2021/057835, Invitation to pay Additional Fees and Preliminary International Search Results.
U.S. Appl. No. 16/706,764, Non-Final Office Action Response, dated Sep. 7, 2021.
U.S. Appl. No. 17/543,852, Application as filed Dec. 7, 2021.
U.S. Appl. No. 17/543,886, Application as filed Dec. 7, 2021.
U.S. Appl. No. 17/543,925, Application as filed Dec. 7, 2021.
PCT/IB2021/057835, Int'l Search Report and Written Opinion, dated Jan. 27, 2022.
U.S. Appl. No. 17/087,815, Non-Final Office Action, dated Feb. 24, 2022.
U.S. Appl. No. 15/788,058, Prosecution History through Jul. 19, 2022.
U.S. Appl. No. 16/706,764, RCE, Jul. 19, 2022.
U.S. Appl. No. 16/706,764, Notice of Allowance, dated Mar. 17, 2022.
U.S. Appl. No. 17/087,815, Response to Non-Final Office Action, dated May 23, 2022.
U.S. Appl. No. 16/706,764, Issue Fee Paid, dated Jun. 15, 2022.
U.S. Appl. No. 17/336,416, Non-final Office Action, dated Jun. 16, 2021.
U.S. Appl. No. 17/840,966, Application as filed Jun. 15, 2022.
U.S. Appl. No. 15/788,058, Ntc Appeal with Pre-Appeal Brief Conference Request, Sep. 7, 2022.
U.S. Appl. No. 16/706,764, Ntc Allowance, dated Sep. 8, 2022.
U.S. Appl. No. 16/801,277, Non-Final Office Action, dated Aug. 30, 2022.
U.S. Appl. No. 17/087,815, Notice of Allowability dated Sep. 9, 2022.
U.S. Appl. No. 17/087,815, Notice of Allowance dated Sep. 1, 2022.
U.S. Appl. No. 17/336,416, Response to Non-final Office Action, dated Sep. 12, 2022.
U.S. Appl. No. 17/891,939, Application filed Aug. 19, 2022.
U.S. Appl. No. 15/788,058, Request for Continued Examination, Amendment and IDS, Nov. 3, 2022.
U.S. Appl. No. 15/788,058, Notice of Allowance dated Nov. 30, 2022.
U.S. Appl. No. 16/801,277, Response to non-final Office Action, dated Nov. 28, 2022.
U.S. Appl. No. 17/543,852, Non-Final Office Action, dated Dec. 5, 2022.
U.S. Appl. No. 15/788,058, filed Oct. 19, 2017.
U.S. Appl. No. 16/706,764, filed Dec. 8, 2019.
U.S. Appl. No. 17/840,966, filed Jun. 15, 2022.
U.S. Appl. No. 16/801,227, filed Feb. 26, 2020.
U.S. Appl. No. 17/087,815, filed Nov. 3, 2020.
U.S. Appl. No. 17/336,416, filed Jun. 2, 2021.
U.S. Appl. No. 17/543,852, filed Dec. 7, 2021.
U.S. Appl. No. 17/543,886, filed Dec. 7, 2021.
U.S. Appl. No. 17/543,925, filed Dec. 7, 2021.
U.S. Appl. No. 17/891,939, filed Aug. 19, 2022.
M. 0. van Deventer, H. Stokking, M. Hammond, J. Le Feuvre and P. Cesar, "Standards for multi-stream and multi-device media synchronization," in IEEE Communications Magazine, vol. 54, No. 3, pp. 16-21, Mar. 2016, doi: 10.1109/MCOM.2016.7432166. (Year: 2016).
U.S. Appl. No. 18/094,369, Application as filed Jan. 8, 2023.
U.S. Appl. No. 16/706,764, Prosecution Reopened, Jan. 4, 2023.
U.S. Appl. No. 16/801,277, Final Office Action, dated Dec. 23, 2022.
U.S. Appl. No. 16/801,277, RCE and response to Final Office Action, dated Mar. 21, 2023.
U.S. Appl. No. 17/336,416, Final Office Action, dated Jan. 9, 2022.
U.S. Appl. No. 17/543,886, Non-Final Office Action, dated Dec. 19, 2022.
U.S. Appl. No. 17/543,925, Non-final Office Action, dated Jan. 31, 2023.
U.S. Appl. No. 16/706,764, Notice of Allowability, dated May 11, 2023.
U.S. Appl. No. 17/336,416, RCE and Response to Final Office Action, dated Apr. 4, 2023.
U.S. Appl. No. 17/543,852, Response to Non-Final Office Action, dated Apr. 3, 2023.
U.S. Appl. No. 17/543,886, Response to Non-Final Office Action, dated Apr. 5, 2023.
U.S. Appl. No. 18/314,987, Application as filed May 10, 2023.
U.S. Appl. No. 17/543,852, Final Office Action, dated May 26, 2022.
U.S. Appl. No. 17/543,886, Final Office Action, dated May 25, 2023.
U.S. Appl. No. 17/543,925, Non-final Office Action Response, dated May 29, 2023.
U.S. Appl. No. 17/891,939, Examiner Interview Summary, dated Jun. 8, 2023.
U.S. Appl. No. 17/891,939, Amendment and Examiner Initiated Interview Summary, dated May 31, 2023.
U.S. Appl. No. 17/891,939, Notice of Allowance, dated Jun. 8, 2023.
U.S. Appl. No. 18/094,369, Non-Final Office Action, dated Jun. 8, 2023.
U.S. Appl. No. 16/801,277, Notice of Allowance & Interview Summary, dated Jul. 12, 2023.
U.S. Appl. No. 16/801,277, Supplemental Amendment & Interview Summary, dated Jun. 27, 2023.
U.S. Appl. No. 17/543,925, Final Office Action, dated Jul. 7, 2023.
U.S. Appl. No. 17/543,925, Response to Final Office Action and eTerminal Disclaimer, dated Jul. 8, 2023.
U.S. Appl. No. 18/222,453, Continuation application as filed, Jul. 16, 2023.
U.S. Appl. No. 17/336,416, Non-Final Office Action, dated Jul. 28, 2023.
U.S. Appl. No. 17/543,925, Notice of Allowance and Examiner Interview Summary, dated Jul. 27, 2023.
U.S. Appl. No. 18/363,897, Application as filed Aug. 2, 2023.

* cited by examiner

INTERACTIVE MEDIA EVENTS

CROSS-REFERENCE TO RELATED APPLICATIONS

This application is related to co-pending U.S. patent application Ser. No. 16/801,277, filed on 26 Feb. 2020, in the name of inventor Neil Marten, and entitled "Devices, Systems and Processes for Facilitating Watch Parties" (the "'277 application"), the entire contents of which are incorporated herein by reference.

This application is also related to co-pending U.S. patent application Ser. No. 17/336,416, filed on 2 Jun. 2021, in the name of inventor Neil Marten, entitled "Consolidated Watch Parties," (herein, the "'416 application"), the entire contents of which are incorporated herein by reference.

TECHNICAL FIELD

The technology described herein generally relates to devices, systems, and processes for facilitating interactive media events arising from one or more watch parties and/or consolidated watch parties.

BACKGROUND

Various devices, systems and processes today enable a person to be presented with content, such as a football game, television show, video game, soundtrack, or the like using a presentation device. Such content may be presented to a user in a humanly perceptible format, such as visually, audibly, as vibrations, combinations of the foregoing, or otherwise. Often a first user desires to be presented with such content at substantially the same time as another, second user. The second user may be physically located remotely to the first user, such as in another building, city, state, country or otherwise. The first user and the second user may desire to receive such content and, together participate in the reception of such content, include the sharing of their reactions to such content with others at substantially the same time as the content is presented to the users. While the '277 application and the '416 application describe various approaches for achieving substantially simultaneous synchronization of content and/or user reactions thereto during a watch party, additional approaches for content and user reaction synchronization is needed. Further, a delayed presentation of a synchronization of content and other user reactions thereto during a watch party may provide a more user friendly experience, whereby non-participating (or view only) users can receive a synchronized and Interactive Presentation of content and user reactions thereto on a time delayed basis, and without incurring delays due to bandwidth, latency, device and other constraints of one more users attending a watch party delaying the watch party for other users.

Further, a participant in a watch party may desire to later review one or more content segments and/or "chat data" (as described in the '277 application) after a given watch party or a collection of watch parties have occurred, while avoiding a review or scrolling through of one or more portions of the watch party to find segments of interest therein. Consolidated Watch Parties, which are described in the '416 application, can also benefit from the approaches described herein for synchronizing content and user reactions after a Watch Party has concluded and/or after a given delay period has occurred during an on-going Watch Party or Consolidated Watch Party. The various embodiments of the present disclosure address these and other needs.

SUMMARY

Various implementations are described of devices, systems, and processes for facilitating "Interactive Media Events."

In accordance with at least one implementation of the present disclosure a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes an interactive media event (IME). The interactive media event may include a sync server; a first user device, and a second user device, where the first user device and second user device are communicatively coupled to the sync server. The sync server executes computer instructions instantiating a content segment engine which outputs a party matter to a second user device. The sync server executes computer instructions instantiating an IME engine which receives, from the second user device, a later reaction to the party matter. Other embodiments of this aspect include corresponding computer systems, apparatus, and computer programs recorded on one or more computer storage devices, each configured to perform the actions of the methods.

Implementations may include one or more of the following features. The IME engine may synchronize the later reaction with the party matter. The party matter may include a media event and a prior reaction to the media event received from the first user device. The media event may include a primary content segment. The media event may include synchronization information associated with the primary content segment. The prior reaction may be synchronized to the primary content segment using the synchronization information. The later reaction may be synchronized to the primary content segment using the synchronization information. The later reaction may be synchronized to the prior reaction.

The prior reaction may include chat data captured, during a party, by the first user device. The chat data may include at least one of a facial response and an audible response, by a first user of the first user device, to a primary content presented during the party. The later reaction may include second chat data captured by the second user device. The chat data may include at least one of a facial response and an audible response to at least one of the primary content and the prior reaction.

The party matter may be associated with a consolidated watch party. The party matter may include a prior reaction to a segment of primary content presented during the consolidated watch party.

The sync server may execute computer instructions instantiating a consolidation engine which: consolidates the segment of primary content with the prior reaction. The party matter may include a primary content segment and a prior reaction to the primary content segment. The IME engine may generate an IME by synchronizing the later reaction with at least one of the primary content segment and the prior reaction to the primary content segment. The party matter may include a plurality of primary content segments.

The sync server may execute computer instructions instantiating a consolidation engine which selects a given primary content segment, from the plurality of primary content segments, based upon a first tag associated with the given primary content segment. The consolidation engine may select a prior reaction to a selected given primary content segment and generate the party matter based on a selected prior reaction. The prior reaction may be tagged with the first tag.

The later reaction may be tagged with the first tag. The first tag may correspond to a matter designation and to a criteria. The matter designation may correspond to a criteria that may include at least one of: most popular, funniest, most viewed, highest rated, best of, scariest, informative, fact verified, and source verified.

The IME engine generates an IME by synchronizing the later reaction with the selected given primary content segment and the selected prior reaction. The sync server may execute computer instructions further instantiating a consolidation engine to select the party matter from a collection of party matters for use in generating an IME. The party matter may include a media event and a prior reaction to the media event received from the first user device. The media event may include a primary content segment provided by a content source. Selection of the party matter may occur based upon at least one of a first tag associated with the primary content segment and a second tag associated with the prior reaction. The first tag may be provided by the content source. The sync server may execute computer instructions instantiating a consolidation engine associate the second tag with the prior reaction based upon information associated with the prior reaction. Implementations of the described techniques may include hardware, a method or process, or computer software on a computer-accessible medium.

BRIEF DESCRIPTION OF THE DRAWINGS

The features, aspects, advantages, functions, modules, and components of the devices, systems and processes provided by the various implementations of embodiments of the present disclosure are further disclosed herein regarding at least one of the following descriptions and accompanying drawing figures. In the appended figures, similar components or elements of the same type may have the same reference number and may include an additional alphabetic designator, such as 108a-108n, and the like, wherein the alphabetic designator indicates that the components bearing the same reference number, e.g., 108, share common properties and/or characteristics. Further, various views of a component may be distinguished by a first reference label followed by a dash and a second reference label, wherein the second reference label is used for purposes of this description to designate a view of the component. When the first reference label is used in the specification, the description is applicable to any of the similar components and/or views having the same first reference number irrespective of any additional alphabetic designators or second reference labels, if any.

DETAILED DESCRIPTION

Figure 1:
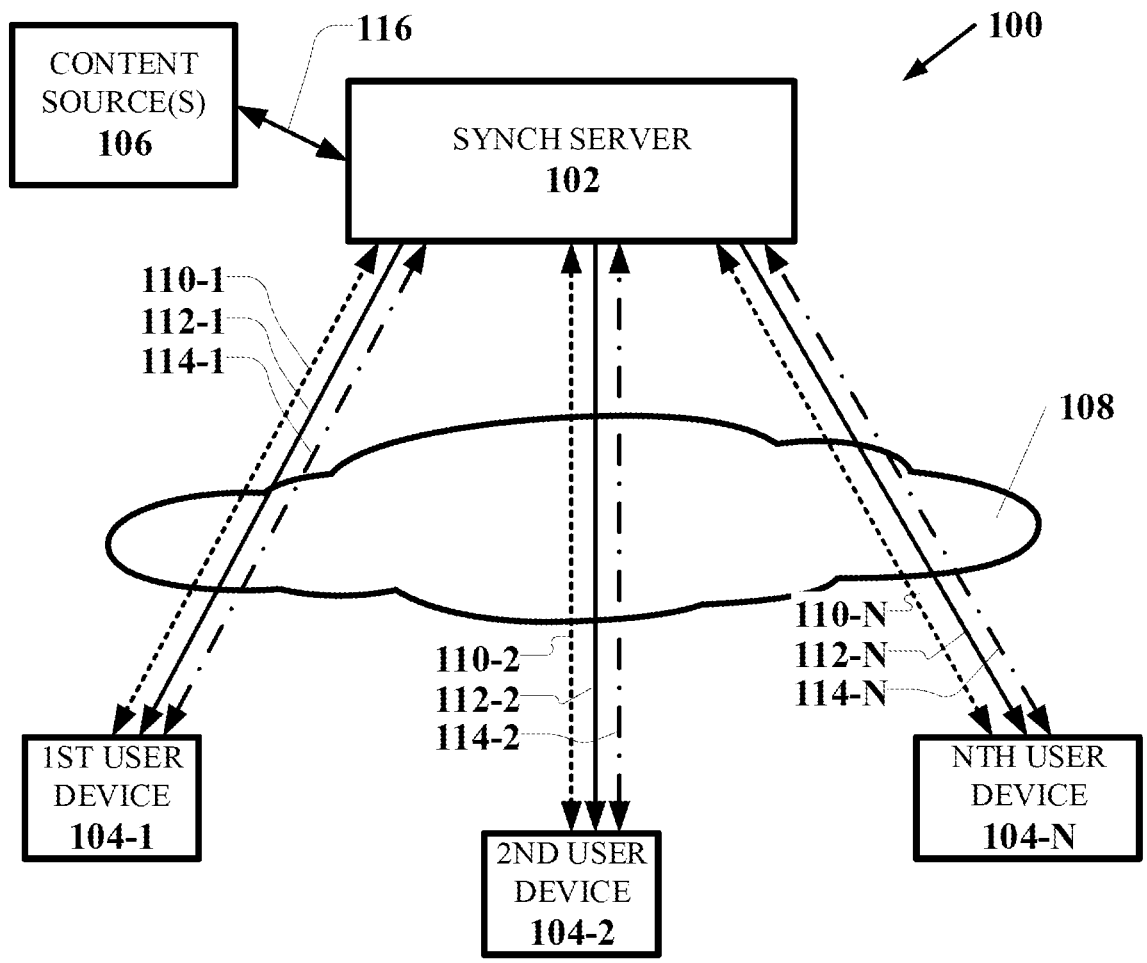
FIG. 1 is a schematic illustration of a system for facilitating Interactive Media Events and in accordance with at least one implementation of the present disclosure.

Various implementations of the present disclosure describe devices, systems, and processes for utilizing chat data and content (as defined below) presented during a watch party, a consolidated watch party, and/or an interactive consolidated watch party to facilitate Interactive Media Events. As used herein, an Interactive Media Event is a time delayed, non-real-time presentation of a given content and multiple, synchronized reactions by users to such given content. For an Interactive Media Event, reactions by multiple users to a primary content may be captured, recorded, synchronized, and then presented during a presentation of the primary content. Unlike a watch party, where synchronization of a primary content presentation to multiple users is provided substantially simultaneously with a first presentation of the primary content, for an Interactive Media Event, users' reactions to such content and/or to other user's reactions may occur independently, in time and space, of any other user's reactions, and such later reactions maybe presented in a synchronized manner with other users' reactions, as if each of the users viewing the primary content or other content, were presented with such content at substantially the same time.

A reference to "Cloud" includes references to cloud computing, cloud storage, cloud communications, and/or other technology resources which a user may not actively manage the providing or use of such resources. A use of a Cloud resource may be private (limited to certain users and/or uses), public (available for many users and/or uses), hybrid, dedicated, non-dedicated, or otherwise. It is to be appreciated that any device or system of the various embodiments of the present disclosure may use Cloud resources to provide for data processing, storage and other functions.

"Substantially simultaneous" means without incurring a humanly perceptible delay between a first event or condition, such as a presentation of a primary content (as described below), and a second event or condition, such as a presentation of secondary content (as described below), to two or more users using their respective user devices.

"Separate" means a first user may be physically or virtually separated from one or more second users such that the users are, respectively and uniquely, presented content in a format perceptible by such user. Such separation may occur geographically, wherein a first user is in a different room, building, city, state, or country than one or more second users. The separation may occur virtually, such as when a first user perceives the content and/or reaction(s) as presented in a first format (such as an audible portion of the football game in a first language), while a second user perceives the content and/or reactions in a second format (such as the audible portion of the football game being provided in a second language).

A "media event" includes a combination of "primary content" and "synchronization information" (as described below) for such primary content.

"Content" refers to any information that may be presented, using a suitable presentation device, to a user in a humanly perceptible format. Non-limiting examples, include video, television programs, audio programs, speeches, concerts, gaming, or otherwise. Content may originate from any source, including live, augmented reality, virtual reality, computer generated, or otherwise. Content may be presented to a given user using any "user device" (as described below). Content may be presented to one or more users "real-time" (as described below) or otherwise. Content may be stored, transmitted, processed or otherwise manipulated in non-humanly perceptible formats that may be converted, by known and later arising devices, systems and methods, into humanly perceptible information presented by a suitable presentation device. Current embodiments of such presentation devices are well known any suitable known or later arising presentation device may be used for content presentation to users.

"Synchronization information" includes information useful in identifying a given point in time relative to a beginning and/or end of a given primary content or segment thereof. Non-limiting examples of "synchronization information" include audio/video ("A/V") frame synchronization data, universal time code data, content based data, metadata associated with a given content, or otherwise.

"Real-time" means as the information and/or data provided in the primary content is captured at the time of its first generation and/or presentation to one or more users. For a non-limiting example, a football match is captured and presented "real-time" when one or more users may view the match, using a presentation device, at substantially the same time (while accounting for data processing and transmission delays) as a spectator, in a viewing stands, can view the match.

"Primary content" is content which is generated by a content source (as further described below) for presentation to multiple users. Primary content may have any form, format, length, duration, or otherwise and includes "content" (as described for at least one implementation below).

"Secondary content" is content generated by another entity, such as a user, an artificial intelligence, or otherwise in reaction, response, based upon, or otherwise (herein, "responsive") in view of a given primary content and/or another secondary content. "Secondary Content" may include one or more user "reactions" (as defined below) to primary content and/or to reactions. Secondary Content may include other information, generated by any entity, such as statistics, background information regarding primary content, information regarding a reaction, or otherwise. Secondary Content may be captured and presented in any format, non-limiting examples including audio/video formats, text based formats, and otherwise. Secondary content may be humanly perceptible or imperceptible. For an implementation, secondary content may include reactions captured as "chat data."

"Chat data" refers to user "reactions" (as described below) captured during a presentation of a given primary content by a user device, communicated to and stored by a server. Chat data may occur during a Party (as described below) or otherwise.

A "content segment" is a portion of content. For a non-limiting example, "primary content" may include audio and video for an entire football game. A "content segment" may include the audio and video for a given scoring play for the football game.

A "reaction" is a response by a user to content. The content may be primary content or secondary content. The reaction may be to all, or one or more primary content segments and/or secondary content segments. A reaction may be imperceptible to others, for example, an elevated heart rate of a given user. A reaction may be perceptible to others, for example, an outburst of sounds, motion (e.g., hand waving), or otherwise by a given user. A reaction may be ephemeral, ongoing, or otherwise.

A reaction may be by a user to a primary content, for example a first user cheering an A/V presentation of a goal being scored in a football game. A reaction may be separately captured and recorded—herein a "prior reaction." One or more prior reactions may occur with respect to any given primary content or segments thereof. Prior reactions may occur separately by multiple users.

A user may react to a prior reaction to a given primary content segment. When captured and recorded by a user device or the like, such user reaction is referred to herein as a "later reaction." For an implementation, a later reaction may be second captured and recorded and communicated to a server for additional storage and/or processing. Based on the media event data, the later reaction may be synchronized by a server, user device, combination thereof, or otherwise with one or more prior reactions and with a given primary content (or segment thereof) so as to be later presentable to a user in synchronization with an earlier presentation of the primary content (or segment thereof) and the earlier occurring one or more prior reaction(s). One or more later reactions may occur with respect to any prior reaction and a later reaction may function as a prior reaction for another second, later reaction. For at least one implementation, later reactions occur after a prior reaction to a given primary content segment has been captured and recorded. For at least one implementation, one or more prior reaction(s) and one or more later reaction(s) may be provided to a server, synchronized by the server based on media event data for a given primary content, and later presented as an Interactive Media Event (as further described herein) to a user.

A "watch party" is a "substantially simultaneous" presentation of "primary content" and "secondary content" to two or more "separate" users.

A "consolidated watch party" ("CWP") is a collection of primary content segments and at least one prior reaction thereto that occurred during a watch party. A CWP may include the non-real-time presentation of content segments presented during a given watch party and prior reactions.

An "interactive consolidated watch party" ("ICWP") is a CWP that may further include later reactions and/or other forms of secondary content. For an ICWP, later reactions may be captured and shared, at any time, between two or more users and communicated as chat data. Such later reactions may be captured and shared, on a synchronized basis, as an Interactive Media Event (as described below). For example, during an ICWP of the football scoring drive, a user viewing a primary content segment and one or more prior reactions thereto may then react, thereby providing one or more later reactions. Such later reactions may occur in response to the primary content and/or to the secondary content. An ICWP may include capturing of later reactions and communication thereof to other users after a "delay period" (as described below).

Watch Parties, CWPs, and ICWPs are herein, collectively referred to as each being a "Party." For at least one implementation, Parties include primary content and secondary content. For another implementation, Parties may include secondary content without including primary content. A given combination of a primary content and one or more secondary content is collectively referred to herein as a "Party matter."

A "delay period" is a period of time after a given presentation of a given primary content during a Party. Such delay period may occur after any given period. The delay period may occur for a pre-determined, dynamically determined, or otherwise determined period. For at least one implementation, a given delay period may be less than one second (1 sec) after a given presentation of a content segment during a Party. For another implementation, a given delay period may be determined based on a quantification of one or more networked communications characteristics occurring during a given Party. For a non-limiting example, a given delay period may be determined, dynamically or otherwise, based on an average network latency for one or more user devices attending a given media event, a worst-case latency for a given user device attending the Party, based upon bandwidth constraints, data processing constraints of one or more user devices, or otherwise. For another implementation, a given delay period may include a waiting period that ends upon a conclusion of a given presentation of a given primary content in a Party. For a non-limiting example, a delay period may end after a sporting event, presented during a Party, concludes or sometime thereafter. For another implementation, a given delay period may include a waiting period that ends upon a conclusion of a given presentation of a given primary content segment during a Party.

An "Interactive Media Event" (or "IME") is a synchronized presentation of a media event with additional secondary content (later reactions), wherein such synchronized presentation occurs after a given delay period. During an IME, the secondary reactions are synchronized based upon synchronization information associated with the media event. An IME may include a synchronization of secondary reactions with various Party matter. The Party matter may be filtered, unfiltered (e.g., including all available), curated, or otherwise combined by a server with later reactions to generate the IME. An IME may vary based upon intended recipient, for example an IME for a given primary content presented during a Party may include secondary content for mature audiences while a second IME for the same given primary content may exclude such adult oriented secondary content.

For an implementation, an IME may include a compilation of synchronized prior reactions and later reactions, based upon synchronization information provided in a media event and with or without including the primary content segment presented in the media event and during a Party.

For at an implementation, multiple iterations of IMEs may be generated. A given IME iteration may include content corresponding to and/or associated with a Party. When further viewings of a Party or an IME occur, $n^{th}$ iterations of a given IME may be generated. The original IME may be updated with each iteration thereof, with secondary content being added or deleted to the IME. For at least one implementation, an IME may include an ever-expanding collection of later reactions. During an IME, prior reactions and later reactions may be synchronized by a server or otherwise with the primary content presented during a given Party or one or more Parties.

A non-limiting example of an IME, is an orchestral presentation where multiple musicians receive the primary content (the instructions from a conductor) and provide their reactions (their musical tracks) in response thereto. A primary content of an orchestral movement, a media event, may include a live and/or pre-recorded audio and/or video stream of instructions provided by the conductor. Music generated by a lead musician, such as a first violinist, may provide a first reaction (a prior reaction) to the conductor's instructions. "Synchronization information" provided with the primary content (such as the conductor's baton strokes). The synchronization information may be provided in any form that corresponds to the primary content, non-limiting examples including a musical score, audio/video time frame data, or otherwise.

For an implementation, the primary content and the synchronization information provide a baseline presentation—a media event—which respect to which other musicians (such as one or more of the first and second violinists) may interact by providing their own contributions; "prior reactions" by the $1^{st}$ violinist and "later reactions" by the other musicians. Such reactions maybe captured, recorded, uploaded to a server, and then synchronized with the media event information to generate a synchronized, multi-user presentation of primary content (the conductor's interpretation of the musical score) and multiple users' reactions thereto (the multiple musicians' independent contributions) thereto, resulting in an IME—a synchronized combination of multiple user reactions to the primary content—the conductor's instructions.

Further, for this non-limiting example, one or more of the users (such as violinists, percussionists, or otherwise) may be remotely located in time and/or space from the first violinist and/or the conductor. The users may utilize a user device to receive the media event from a server. While the users/musicians are presented with the primary content (e.g., the conductor's baton instructions) and prior reaction (e.g., the musical sounds produced by the first violinist), the second musician provide their own musical contributions (their later reactions), using their own instruments. Such later reactions may be captured by each of the second users' user devices. For at least one implementation, such reactions may be captured and time stamped by the respective user device(s). For another implementation, such reactions may be time stamped based upon a corresponding presentation time of the primary content (e.g., the time associated with a conductor's given baton movements). Such time stamps of a given user's reactions may correspond to synchronization information that correspond to the conductor's tempo, to frames synch, other timing information associated with the primary content, or otherwise. Time stamped prior and later reactions may be communicated to a server as secondary content, which the server combines with the media event data to generate an orchestral musical presentation—an IME. The IME may be subsequently presented, in whole or in part, to any user.

It is to be appreciated that the above example of an orchestral presentation as an IME, can also be applied in any context where multiple users' reactions to a primary content and/or to a prior reaction are separately captured and recorded by a respective user device, synchronized by a server, and result in a combined presentation, an IME. Non-limiting examples include multiple user reactions (secondary content) to a stand-up comedy routine (the primary content), multiple user reactions (secondary content) to a scoring event in a sporting match (the primary content), multiple user reactions (user bets) to an online gaming event, such as a fantasy sports events, or otherwise.

For at least one implementation, an IME may be generated from reactions captured during a Party. For another implementation, an IME may be generated from reactions captured during serial, non-synchronized presentations of primary content.

As further described in the '277 Application and in the Consolidated Watch Party Applications, during a Party, a sync server may be configured to transmit a given primary content segment, e.g., a portion of a motion picture, as a first content to the first user device and as a second content to the second user device. The sync server may be configured to adjust a first bit rate for the first content. Upon adjusting the first bit rate, the first content and second content may be respectively provided to the first user device and the second user device such that the first user device and the second user device can substantially simultaneously and separately present the first content to the first user and the second content to the second user. Reactions by the first user and/or the second user may be captured by a user's respective user device and communicated, via the sync server and to other users participating in a given Party, substantially simultaneously with the presentation of the content to one or more of the users.

For at least one implementation of an IME, such real-time synchronization of content presentations by multiple user devices may occur on a "delayed real-time basis," which is defined herein as a delay period greater than one hundred milliseconds (100 msec) and less than five hundred milliseconds (100-500 msec). During an IME, the delay period may be fixed. The delay period may vary based upon then arising bandwidth, latency, and other networking and/or data processing constraints.

During an IME presented on a delayed real-time basis, a given primary content segment, a first user reaction (a prior reaction) and one or more second user reaction(s) (each being a later reaction) may be captured by user devices, communicated to a server, synchronized by the server, and presented to one or more of the first, second and/or thirds users within a determined, delayed real-time basis. For at least one implementation, third users may be passive users who are not permitted, at a given time, to provide secondary reactions. In one implementation, the third users may be presented, within the determined delayed real-time basis period, with a time synchronized presentation of the primary content segment, the prior reaction and one or more later reactions and/or other secondary content.

As shown in FIG. 1, one implementation of a system for facilitating IMEs may include a synchronization ("sync") server 102 that is communicatively coupled by a communications network 108 to a first user device 104-1, multiple user devices 104-2 to 104-N may also be coupled to the sync server.

A content source 106 may be coupled to the sync server 102. Local copies of content segments may be maintained by the sync server 102. The sync server 102, user devices 104-1 to 104-N, and content source(s) 106 may be the same or different than those used during one or more Parties and with respect to which a given IME is generated. For a least one implementation, an IME may generated from primary content presented during two or more prior Parties. For example, an IME of a user's favorite football team may include primary content segments from two or more football games during a season.

For at least one implementation, an IME may be generated from a "highlights reel" of a given season that includes curated and/or selected primary content segments from a larger collection of primary content segments. An IME may include selections of prior reactions and selections of later reactions to such primary content segment selections.

The system components of the implementation of FIG. 1 are further described below with reference to FIG. 1 and FIG. 2.

Sync Server 102

Figure 2:
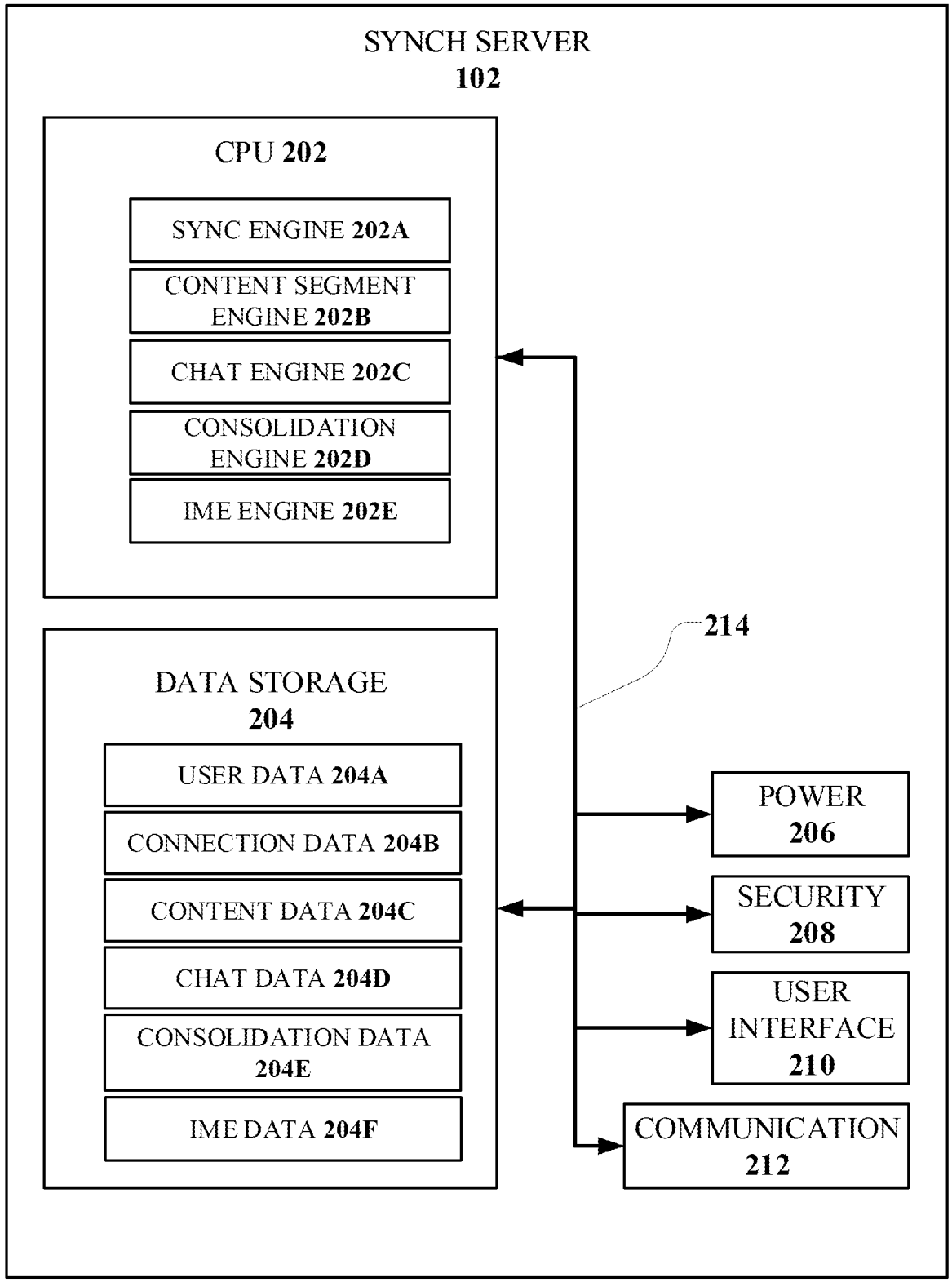
FIG. 2 is a schematic illustration of a synchronization server for use in facilitating Interactive Media Events and in accordance with at least one implementation of the present disclosure.

As shown in FIG. 2, the sync server 102 may include and/or be communicatively coupled to a central processing unit (CPU) 202. The CPU 202 may be provided by any local processing device capable of executing one more computer executable instructions (herein, a "computer instruction") which, in accordance with an implementation of the present disclosure, facilitates one or more data processing operations including, and not limited to, one or more computer engines such as a sync engine 202A, a content segment engine 202B, a chat engine 202C, a consolidation engine 202D, and an IME engine 202E (such computer engines are further described below). One or more of the computer engines 202-A/B/C/D/E may be combined, included, not included, distributed across one or more devices, such as one or more user devices 104, and/or provided separately. For at least one implementation, a consolidation engine 202D may not be included.

The CPU 202 may include one or more physical (as compared to logical) components configured for such data processing operations. The CPU 202 may include one or more hardware processors, such as 32-bit and 64-bit central processing units, multi-core ARM based processors, microprocessors, microcontrollers, and otherwise. The computer instructions may include instructions for executing one or more applications, software computer engines, and/or processes configured to perform computer executable operations (herein, "engines"). Such engines may arise in any computing configuration including, and not limited to, local, remote, distributed, blade, virtual, or other configurations and/or systems configured for use in support of an implementation of one or more embodiments of the present disclosure.

The CPU 202 may be communicatively coupled by a data bus 214 or similar structure to a data storage 204, which may also be referred to as a "computer readable storage medium." The data storage 204 may be a single storage device, multiple storage devices, or otherwise. The data storage 204 may be provided locally with the sync server 102 or remotely, such as a data storage service provided on the Cloud, and/or otherwise. Storage of data including, and not limited to, user data 204A, connection data 204B, content data 204C, chat data 204D, consolidation data 204E, IME data 204F, and other data may be managed by a storage controller (not shown) or similar component.

It is to be appreciated that a storage controller manages the storing of data and may be instantiated in one or more of the data storage 204, the CPU 202, on the Cloud, or otherwise. Any known or later arising storage technologies may be utilized. Non-limiting examples of devices that may be configured for use as data storage 204 include electrical storage devices, such as EEPROMs, random access memory (RAM), Flash drives, and solid-state drives, optical drives such as DVDs and CDs, magnetic storage devices, such as hard drive discs, magnetic drives, magnetic tapes, memory cards, such as Compact Flash (CF), Secure Digital (SD) cards, Universal Serial Bus (USB) cards, and others.

Available storage provided by the data storage 204 may be partitioned or otherwise designated by the storage controller, or otherwise, as providing for permanent storage and temporary storage. Non-transient data, transient data, computer instructions, or the like may be suitably stored in the data storage 204 for any amount of time used to execute one or more computer instructions. While being used for execution of a computer instruction, such data is herein considered to be non-transient. While stored by the storage device, data is herein considered to be non-transient. As used herein, permanent storage is distinguished from temporary storage, with the latter providing a location for temporarily storing data, variables, or other instructions used for a then arising data processing operations. A non-limiting example of a temporary storage device is a memory component provided with and/or embedded onto a processor or integrated circuit provided therewith for use in performing then arising data calculations and operations. Accordingly, it is to be appreciated that a reference herein to "temporary storage" is not to be interpreted as being a reference to transient storage of data. Permanent storage and/or temporary storage may be used to store transient and non-transient computer instructions and other data.

The sync server 102 may be any computing device capable of facilitating one or more of the operations described below and/or otherwise provided by an implementation of the present disclosure.

The sync server 102 may be further configured to include a power supply 206. The power supply 206 may include any known or later arising technologies which facilitate the storage, supplying, transforming, or other use of electrical energy. Non-limiting examples of such technologies include batteries, power converters, inductive charging components, transformers, line-power components, solar power components, and otherwise.

The sync server 102 may be further configured to include a security component 208. The security component 208 may be provided as a hardware security component, a software executed security component, and/or a combination thereof. Security components 208 are well known in the art and may include any known or later arising security hardware and/or software components, including computer instructions, or combinations thereof, that are configured to secure content, communications, restrict access to devices, processes, components, and data therewith, and otherwise. The security component 208 may be used to facilitate secure transmission, processing, storage, and otherwise of any data used in accordance with an implementation of the present disclosure.

The sync server 102 may be further configured to include a user interface 210. The user interface 210 may include any known or later arising human to device interface components, processes and technologies. User interfaces 210 are well-known in the art and non-limiting examples include interfaces facilitating human to device communication of information in any form including include audible inputs (such as spoken commands) and outputs (generated sound), visible inputs (such as eye tracking and facial recognition) and outputs (such as visible images presented on a display device, LEDs, or otherwise), touch inputs (such as on a trackpad, touch screen or otherwise), touch feedback (such as vibrations or other movements), gesture tracking, and otherwise. The user interface 210 may be coupled to and/or include the one or more presentation devices (not shown). The presentation devices facilitate interactions between the user and the sync server 102. Non-limiting examples of presentation devices include speakers, displays, and others.

The sync server 102 may be further configured to include a communications interfaces 212. The communications interface 212 may be configured to use any known or later arising communications and/or networking technologies which facilitate use of the communications network 108 (as further described below). Communication interfaces are well-known in the art and non-limiting examples include Ethernet cards, USB and storage medium interface cards, radio frequency transceivers, and others.

User Device(s) 104

Referring again to FIG. 1 and for at least one implementation of an IME, the system 100 includes at least one user device, such as first user device 104-1. For an IME, one or more additional user devices may be included, such as a second user device 104-2 to an Nth user device 104-N. Such additional user devices may be included in the system 100 at the same time as the first user device 104-1 is initially presented with "matter" or at a later time.

The user devices 104 may be similarly configured to the sync server 102 to include one or more processors, data storage, user interface, power supplies, security, and communications interface components. The user devices 104 may also include one or more location components (not shown) that may be useful in determining a then present location for the user device 104. The characteristics and capabilities of such components are well known in the art and one or more of such components may be configured to execute computer instructions which facilitate IMEs. Non-limiting examples of user devices 104 include smartphones, laptop computers, tablet computing devices, desktop computers, smart televisions, smart glasses, virtual reality glasses, augmented reality glasses, earbuds/headphones and other audible output devices, and other devices. User devices 104 may be communicatively coupled to a cable system, satellite system, streaming audio and video system, online gaming system, and/or other content distribution systems, on-line content distribution systems, and the like to facilitate communications with the sync server 102.

Content Sources 106

For at least one implementation, the system 100 may include one or more content sources 106. The content sources 106 may provide some or all of the "matter" presented during a Party and an IME. A content source 106 may be similarly configured to the sync server 102 to include one or more processors, data storage, user interface, security, communications, and/or location components. The characteristics and capabilities of such components are well known in the art and one or more of such components may be configured to execute computer instructions which facilitate IMEs. Non-limiting examples of content sources 106 include cable and satellite television systems, such as those provided by COMCAST and DISH NETWORK, streaming content sources, such as those provided by SLING TV and YOUTUBE, video-on demand sources, such as those provided by NETFLIX, HULU and others, and other sources of content.

For at least one implementation, a content source 106 may be a user device 104. The user device 104 may be configured to provide additional content, such as live or recorded content, for use during a Party and an IME. For at least one implementation, a user device 104 may function as a presentation device to a given user during an IME. During an IME, a user device 104 may function as a content source for presentation of primary content, additional content, prior reactions, and/or later reactions, to users.

For example, a birthday party may be captured by a user's device, such as a smartphone, communicated to the sync server 102 and presented to other users, during a Party, with later reactions by one or more of such users being shared with the other users during an IME. An IME may be generated based on content associated with the Party and the IME may include any given "matter." For the non-limiting birthday party example, a Party may provide the moment(s) of realization (prior reactions), by a person opening a present, of what the present entails. Such prior reactions, such as joy, puzzlement, or the like, and having been captured during the Party, may be presented with any later reactions during the IME, such as a later reaction by a relative later viewing the Party. For an implementation, such later reactions may be synchronized with the prior reactions, provided by the Party matter, in an IME presentation.

For at least one implementation of an IME, the sync server 102 may be configured to store one or more content segments selected from content presented during a Party and/or an IME as content data 204C. For another implementation, the sync server 102 may be configured to store one or more links to content segments selected from the content presented during a Party as content data 204C. The one or more links may identify a content source 106 and a location of where the given content segment(s) can be retrieved from such content source 106. The content may then be presented, as Party matter, during an IME. Later reactions may be captured and synchronized during the IME.

Network 108

For at least one implementation, the system 100 includes a communications network 108 that communicatively couples a user device 104 with the sync server 102 and communicatively couples the content source 106 with the sync server 106.

For at least one implementation, user devices 104 may be directly or indirectly coupled. The communications network 108 may utilize any known and/or later arising communications and/or networking technologies, standards, protocols or otherwise. Non-limiting examples of such technologies include packet switch and circuit switched communications technologies, such as and without limitation, Wide Area Networks (WAN), such as the Internet, Local Area Networks (LAN), Public Switched Telephone Networks (PSTN), Plain Old Telephone Service (POTS), cellular communications networks such as a 3G/4G/5G or other cellular network, Internet of Things (IoT) networks, Cloud based networks, private networks, public networks, or otherwise.

The communications network 108 may utilize mid-band and/or high band 5G communications frequencies. As is commonly known and appreciated, mid-band 5G communications frequencies typically support communications of 100-400 Mb/s download and are typically deployed over 2.4 GHz to 4.2 GHz frequencies. Likewise, high band 5G communications frequencies typically support communications of 1-2 Gb/s download and are typically deployed over 24-72 GHz frequencies.

One or more communications and networking standards and/or protocols may be used including, without limitation, the TCP/IP suite of protocols, the Extensible Message and Presence Protocol (XMPP), VOIP, Ethernet, Wi-Fi, CDMA, GSM/GRPS, TDMA/EDGE, EV/DO, WiMAX, SDR, LTE, MPEG, and others.

As shown in FIG. 1, one or more communications links may be established between a user device 104 and the sync server 102. It is to be appreciated that any combination of communications links, including the communications links, may be combined or provided as single, multiple or other combinations of communication links. Accordingly, it is to be appreciated that the communications links are described herein for purposes of functional explanation and are not limited to any particular physical configurations.

A user device 104 may establish a sync link 110-1/2/N with the sync server 102. During an IME, the sync link 110 may be used to facilitate communication of synchronization information by and between a given user device 104 and a given sync server 102.

As further shown in FIG. 1, a user device 104 may establish a content link 112-1/2/N with the sync server 102. The content link 112 may be used to facilitate communication of Party "matter" by the sync server 102 and/or from a content source 106 to a user device 104 participating in an IME. While depicted in FIG. 1 as a unidirectional link, it is to be appreciated that when a given user device 104 may also function as a content source for given Party matter to be presented during an IME. The content link 112 may be used to communicate a given matter and later reactions, during an IME, to a given user device.

During an IME, a user device 104 may be configured to be a receiver and a source of a given "matter." For a non-limiting example, a first user device 104-1 may be configured, during an IME, to present additional content. For example, a video feed of another content not previously presented during a given one or more Parties may be presented by a user device or a server. Additional content may be obtained from other content sources 106 during an IME.

As further shown in FIG. 1, one or more user devices 104 may establish a chat link 114-1/2/N with the sync server 102. For at least one implementation, the chat link 114 may be used to facilitate bi-directional communication of one or more users' later reactions to a given Party matter during an IME. Reactions captured by a given user device may be shared substantially simultaneously, or at another time, with other users during (or after) a multi-user presentation of an IME, appended to the IME for presentation to other users at another time, or otherwise captured and processed.

For at least one implementations, user later reactions during an IME may be captured and stored in temporary storage. For another implementation, a given user's later reactions during an IME may be captured and stored in permanent storage.

Later reactions captured by any user device may be shared with any given presentation of an IME. A user's later reactions during a presentation of an IME may be communicated to the sync server 102 using the chat link 114 and redistributed to the other users, after a delay period, using the content link 112. For example, audio and/or video of a user's later reaction may be communicated over respective content links 112 to other users in a picture-in-picture, overlay, separate audio channel, mixed audio channel, text message stream, closed captioning stream, or otherwise on a delayed real-time basis. Later reactions may be communicated, using the system 100, in one or more combined or separate data streams, such as combined or separate MPEG, AAC, other audio and/or video streams, and/or as other data stream.

One or more user devices 104 and/or the sync server 102 may be configured to mix, present or otherwise process later reactions in accordance with preferences of a given user, based upon a default setting, or otherwise. One or more of the sync server, a transmitting user device, and/or a receiving user device may be configured to transform later reactions provided by a given user into an audible, visual, grammatical, phonetic, language, or other humanly perceptible format. For example, audible later reactions in the Spanish language may be translated into the English language. Similarly, audible later reactions may be converted to text for hearing impaired users and physical reactions (such as clapping or the like) may be converted to descriptive text for visually impaired users. Other later reactions may be converted for any given implementation. For at least one implementation, Cloud based resources may be used for later reaction processing.

The sync server 102 may be configured to process and use, in subsequent Parties and/or IMEs, later reactions captured during an IME in lieu of and/or in addition to prior reactions. For example, a prior reaction containing profanity may be replaced with a later reaction not containing profanity. Similarly, an incomplete prior reaction may be augmented by a later reaction expounding thereon.

As further shown in FIG. 1, one or more source links 116 may be established between a content source 106 and the sync server 102 and/or one or more user devices 104. For at least one implementation, source links 116 facilitate the providing of additional content and/or content segments to a given one or more user devices 104. The additional content and/or content segments may be provided indirectly, for example, by routing such content through and/or via the sync server 102 and/or one or more streaming servers (not shown) operating under direction and/or control of the sync server 102.

One or more direct connections between a content source 106 and a user device 104 may be used. As used herein, a "direct" connection between a content source 106 and a user device 104 does not utilize the sync server 102, or a streaming server operating under the direction and control of the sync server 102, to provide a given Party matter, to a given user device 104, during an IME. A hybrid topology may be used where in-direct and direct connections are used between content sources 106, sync server 104, and one or more user devices 104.

Referring again to FIG. 2, the sync server 102 may be configured to manage and process content and reactions for facilitating IMEs by executing computer instructions for the sync engine 202A, content segment engine 202B, chat engine 202C, the consolidation engine 202D, the IME engine 202E, and other engines. Such computer engines may also be instantiated and executed on any basis such as on a distributed basis with one or more of the user devices 104 facilitating data processing for a given engine.

Sync Engine 202A

During an IME, the sync engine 202A facilitates the providing of Party matter to a given user device. Such providing of Party matter may occur after a given delay period, such as but not limited to on a delayed real-time basis. Synchronization may include the providing of transitions between multiple content segments, such as fading in, fading out, or the like. During an IME, the sync engine 202A may facilitate synchronization of one or more Party matter with later reactions amongst the various user devices.

The sync engine 202A may manage formation of an IME, determine latency, user device delays, and other delays, and synchronize the providing of given Party matter and later reactions within a delay period. During an IME, synchronization may occur based upon one more identifiable portions of one or more of the media events associated with a Party matter, such as a timestamp for a given primary content segment, a time stamp for a given prior reaction, or a time stamp for a given later reaction. For another implementation, synchronization may occur in view of a given delay period including, but not limited to, a substantially simultaneous basis and/or a delayed real-time basis.

During an IME, content segments, and other data may be identified by one or more of an elapsed time, a remaining time, a presentation time stamp, a decoder time stamp, an absolute time (such as a time based on a universal time), a packet number, a packet identifier, based upon primary content information, based upon metadata for a given content, or otherwise.

Content Segment Engine 202B

For at least one implementation, the content segment engine 202B may manage the providing of one or more given "matters" to one or more given user devices 104 during an IME. The sync server 102 may operate as one or more streaming servers, with a streaming server providing "matters" to the one or more given user devices 104. The content segment engine 202B may request and receive one or more "matters" from a content source 106. The content segment engine 202B may buffer, temporarily store, and/or permanently store such "matter."

For at least one implementation, a content segment engine 202B, whether instantiated on a sync server 102 or a user device 104, may control one or more aspects of presentation of a given "matter." For example, and not by limitation, one or more trick-play modes may be supported by a content segment engine 202B, non-limiting examples of trick-play modes include: Pause, Play, Skip, Fast Forward, Reverse, Stop, and the like. For at least one implementation, trick-play modes (when supported for a given content segment and/or new content) may be selected by a "director" (as defined below) using an appropriate input/output device, such as a remote-control device, a verbal command, a gesture, or otherwise. A contextual voice command, or the like, may be used to initiate presentation of an IME.

As used herein, a "director" is a user device participating in an IME. For at least one implementation, the "first user device" and the "director" are used interchangeably. It is to be appreciated that any given user device may be a director. For an IME, one or more user devices may be a director.

A director 104-1 may specify to the sync server 102 the content segments and prior reactions to be presented during an IME. For example, an IME for a football game may include content segments for Team A and for Team B and one or more prior reactions to a content segment. A first director may select content segments and prior reactions for Team A for a first IME, while a second director may select content segments and prior reactions for Team B for a second IME.

During an IME, the content segment engine 202B may communicate a matter to the two or more participating user devices after a given delay period. Such communications may occur in consideration of latency, user device delays and/or other delays.

The content segment engine 202B may communicate Party matter and/or later reactions at one or more of quality settings, such as a minimum quality setting, a maximum quality setting, or otherwise. When a quality setting is not achievable, at a given time, the content segment engine 202B may take corrective actions until such minimum quality settings can be realized. Non-limiting examples of corrective actions include: pausing presenting of the "matter" to one or more user devices participating in the IME; providing an alternative content link and/or an alternative chat link to those user devices not otherwise receiving the "matter" and/or later reactions at the minimum quality level; recording the event for later presentation; disabling sharing of certain later reactions, in one or more formats (such as audio and video), to and/or from one or more user devices; providing an option to a user of a given user device to accept a different quality level; forcing user devices participating in an IME to jump ahead to a content location for a director; delaying the content; or taking other actions.

The content segment engine 202B may facilitate presentation of a given "matter" and later reaction(s) by adaptively modifying one or more of the resolution, bit rate, content size, communications bandwidth utilized, communications link type used between the content server 102 and a given user device 104, or otherwise such that a given delay period occurs.

The content segment engine 202B may retrieve and synchronize presentation of additional content available from a given user device in order to facilitate an IME. Content engines 202B on the sync server 102 and the user devices 104 may communicate status information over the sync links 110 and may not need to utilize content links 112. A director may control any trick-mode operations, with users of participating user devices requesting trick-mode operations (such as PAUSE) via a chat link 114.

During an IME, two or more user devices may be configured to have trick-mode control capabilities. For an implementation, a selection of a trick-mode operation may result in a communication to the director 104-1 and/or sync server 102 to initiate the selected trick-mode operation with respect to one or more "matters" with corresponding trick-mode operations occurring with respect to any later reactions.

Adaptive bitrate streaming sessions may be used between the sync server 102 and user device 104 to facilitate substantially simultaneous presentation of one or more "matters" and later reactions during an IME. The content segment engine 202B may utilize one or more adaptive bitrate streaming technologies. Non-limiting examples of adaptive bitrate streaming technologies that may be utilized include MPEG-DASH, Adobe Systems HTTP Dynamic Streaming, Apple HTTP Live Streaming, Microsoft Smooth Streaming, and others. By adaptively modifying the bitrate used to provide content to a user device 104 during an IME, a given "matter" and later reactions may be provided, decoded and presented on a user device 104 within a delayed real-time basis.

For example, for a first user device 104-1 communicatively coupled to the sync server 102 using a 100 Mb/s connection, the sync server 102 provides a given "matter" at a 4K resolution over a first content link 112-1. For a second user device 104-2 communicatively coupled to the sync server 102 via a 15 Mb/s connection, the sync server 102 may provide the given "matter" at a 720p resolution over a second content link 112-2. Later reactions may be similarly provided at a given resolution. By providing the given "matter" and any later reactions at the lower resolution to the second user device 104-2, the reception and presentation of such "matter" and later reactions may occur substantially simultaneously; after accounting for any delay period and assuming user device content processing times are equal.

Processing times for user devices for given "matters" and later reactions may vary. The sync server 102 may use the content segment engine 202B, in conjunction with the sync engine 202A, to determine user device delays. Such user device delays may be determined, for example, upon an initialization of a Party, or otherwise. User device delays may be determined based upon test content segments, initial content segments, or otherwise. The sync server 102 may store user device delay information as user data 204A. User device delays may be used in determining a delay period to use for a given IME. User data 204A may include information regarding a user device 104, preferences for a user associated with such user device, and other user device information.

Connection data 204B, as stored in the data storage 204 or otherwise, may be used by the sync server 102 in facilitating an IME. Non-limiting examples of connection data include type of connection, distance of user device from sync server 102, maximum available bandwidth, throughput, latency, and other data. Connection data may be determined for a content link 112 on a once, repeated, or other basis. A content link 112 may change as the location of a given user device 104 changes. For example, a user device 104 may participate in a Party from a home location using a high-speed Internet connection, while participating in a later arising IME using a 4G cellular connection, or vice-versa. Connection data determined and stored and the frequency of such determining and storing may vary based upon a type of connection used by a given user device while participating in an IME. The sync server 104 may use connection data to initially, or later, configure the content link between the sync server 102 and a given user device 104. Connection data may be used to reconfigure a content link, such as by adjusting a bitrate utilized. The content link used to facilitate presentation of content segments and later reactions to multiple users during an IME and within a given delay period may vary over time.

The data storage 204 may include content data 204C. Content data 204C may include primary content segments and secondary content segments. Such segments may be obtained from a Party. Primary content segments presented during a Party may be stored on the sync server 102, on one or more user devices 104, and/or on the Cloud.

Primary content segments may be made available by a producer, publisher, distributor, or other source of such content. For example, a producer for a new television series may designate one or more primary content segments presented during a Party available for use in an IME.

IMEs may be used for promotional purposes. IMEs may also be used for any lawful purpose; non-limiting examples including gambling, sporting contests, shopping, educational and training, cooking, or otherwise. IMEs may be used for sporting contests, such as MARCH MADNESS, the OLYMPICS, the WORLD CUP, FORMULA 1 races, or otherwise to facilitate common viewing of Party matter and later reactions to one or more users.

A sync server 102 may include information identifying Party matters, or elements thereof, such as primary content segments, prior reactions, and/or other secondary content that are stored on one more user devices 104 and presentable during an IME. Such "matters" are referred to herein as "pre-cached matter." Non-limiting examples of pre-cached matter may include commercials, segments of non-live programs, previously designated prior reactions, or otherwise. The sync server 102 may use pre-cached matter to facilitate an IME. Pre-cached matters provide ready access thereto, by the sync server 102 and/or by a given user device. Such ready access may overcome various constraints such as unreliable content links 112, insufficient bandwidth, latency, or otherwise. A sync server 102 may instruct a given user device 104 to access such pre-cached matter on an on-demand or otherwise basis. Such instructions may be provided over one or more of the sync link 110 and/or the content link 112.

Chat Engine 202C

The sync server 102 (and/or one or more user devices 104) may execute a chat engine 202C. The chat engine 202 may facilitate communications between user devices 104 during an IME. Such communications may occur using a chat link 114. Such communications may take any form, such as audio, text message, emoticons, video, GIFs, video, graphics, or otherwise. The chat engine 112 may facilitate user-to-user (or private) communications, user-to-multiple user (or semi-private) communications, user-to-all (or public) communications, or otherwise.

User communications occurring during an IME may be stored in data storage 204 as chat data 204D. Chat data 204D may be time stamped and/or otherwise designated to facilitate synchronization thereof with respect to a given content segment, a prior reaction, a later reaction, and/or additional content such that a later playback of one or more of the foregoing may include chat data corresponding thereto that is generated during the given IME. For example, a later viewing of content segments for the football program during an IME may include later reactions thereto by an Nth user. Such later reactions may be provided in chat data arising between a first user and a second user during the IME. Prior reactions may also be presented, assuming such prior reactions are presented during the IME. Such later synchronization and presentation of chat data may enable the Nth user to enjoy the highlights from the original Party as if participating real-time even when such prior Party may in fact have occurred earlier and the Nth user's reactions are captured as later reactions and associated with the content presented during the IME.

A chat link 114 may be provided as a sub-stream of a content link 112 and/or of a sync link 110 during an IME. Chat data communicated over the chat link 114 may be adaptively bitrate provided to the various users in the IME such that a user device 104 receives a given user's later reactions to a given "matter" within a delay period. For example, a video camera focused upon a first user (or group thereof) may adaptively bit-rate stream images (and audio) of such first user to other second users such that the later reactions of the first user, as presented to the second users, is substantially simultaneous is synch, after accounting for the delay period, with the presentation of the given "matter" being presented to the first user and resulting in the given later reaction. Accordingly, and for at least one implementation, a chat link 114 may utilize higher speed communications links than are used to facilitate the content links 112 such that later reactions to "matter" may be in substantially simultaneous synchronization, after accounting for the delay period, across two or more user devices participating in an IME. For at least one implementation, chat links 114 are provided using networks supporting high band 5G communications.

The chat engine 202C may jointly and/or separately associate prior reactions and later reactions with given content segments and/or (as appropriate) additional content. Such associations, prior reactions, and/or later reactions may be stored as chat data 204D in the data storage 204. Reactions may take any form and may include facial responses, audible responses, and otherwise.

Consolidation Engine 202D

The sync server 102 (and/or one or more user devices 104) may execute a consolidation engine 202D. The consolidation engine 202D may facilitate selection of "matters" for IMEs. The consolidation engine 202D may select matter from previously stored content segments, prior reactions, later reactions, and other data and/or other content.

The consolidation engine 202D may receive "matter designations" from content sources 106 of "matters" presented in a previously occurring Party or IME that correspond to one or more criteria. Non-limiting examples of criteria for matter designations may include popularity, most reactions, most viewed, most presented, length, content type, best of, funniest, scariest, informative, highest rated, fact verified, source verified, or otherwise. The consolidation engine 202D may utilize matter designations and criteria to facilitate an IME, with later reactions generated in response to prior reactions satisfying one or more matter designation criteria.

The consolidation engine 202D may facilitate selection of "matters" for an IME based upon tags provided by a content source 106, in a prior response, or otherwise. For example, a content source 106 may tag portions of a content based upon any criteria. Returning to the non-limiting football game example, the content source 106 may tag a given game based upon when various players, officials, fans or others are depicted, when certain actions occurs, (such as touchdowns, interceptions, sacks, fumbles, or the like), or otherwise. A content source 106 may provide tags that identify prior reactions that correspond to primary content segments. Any tag and tagging methodology may be used by a content source 106. A tag may correspond to a matter designation.

The consolidation engine 202D may select/tag given "matters" for presentation during an IME based upon prior reactions of one or more users during a Party and based further upon later reactions. For a non-limiting example, facial recognition technologies may be used which capture and analyze one or more user's facial reactions to a primary content presented during a Party. Such reactions may include, for example, raised eyebrows, smiling, frowning, closing or opening of eyes or ears, or otherwise. Such reactions may be captured separately or in conjunction with verbal prior reactions, such as yells, screams, sighs, or otherwise, physiological reactions such as elevated heart rates, sweating, or the like, and otherwise. Any prior reaction may be used for tagging purposes. Based upon captured prior reaction(s), the consolidation engine 202D may identify certain content segments and prior reactions for presentation as Party matter in an IME. Captured later reactions may be further tagged.

The consolidation engine 202D may select tags for given "matters" based upon a transcript thereof. For example, transcripts of content dialog and/or prior reaction transcripts may be used to select/tag content segments therein. The consolidation engine 202D may select tags for given "matters" based upon gaps in dialog for a content, gaps in prior reactions, continuity of prior reactions, sounds associated with the primary content and/or prior reactions (such as explosions, gunfire, or otherwise), and otherwise. The consolidation engine 202D may select tags for given "matters" based upon chat data associated with a Party for an IME.

The consolidation engine 202D may use a buffer period arising before and after a given tagged event. For example, a prior reaction of a scream by a user, may be processed by the content source 106, a sync server 106, or otherwise to include content arising before (and giving rise to) the scream. Content occurring after the scream might be included or excluded by the consolidation engine 202D. The amount of any pre-tag or post-tag buffer(s) may be preset, determined by a content source, user device, sync server, automatically determined (for example, using later occurring prior reactions or tags), or otherwise.

Using the one or more tags of "matter", the consolidation engine 202D may assemble "matter(s)" for presentation during an IME. The collection of assembled "matters" herein being a "Party reel." For one implementation, the party reel may constitute a form of a "highlights reel" presentation, a "best of" presentation, or the like. Such assembling of "matters" into the Party reel may include given content segments and/or other forms of tagged "matter" alone or in combination with other forms of "matter." For example, prior reactions to a given content segment may be combined for presentation during an IME in a Party reel. Additional "matter" so assembled for a Party reel may be obtained from another content source, from pre-cached matter, from content data 204C, from chat data 204D, or otherwise.

The consolidation engine 202D may present party reels in accordance with one or more themes, styles, formats, technologies (e.g., augmented, virtual and standard reality), lengths, based upon user preferences (obtained, for example, from user data 204A), or otherwise. The consolidation engine 202D may be user controllable such that a Party reel is presented according to a user selected style, length, format, or otherwise. A Party reel for an IME may include use of additional content, such as additional music, sound effects, visual effects, or otherwise. A user device 104 may be configured to modify, adapt, or otherwise edit a Party reel for presentation on the user device 104 during an IME. Such editing may occur automatically or based upon user inputs.

The consolidation engine 202D may store tags, Party reels, user settings, and other data as consolidation data 204E.

The consolidation engine 202D may generate Party reels as graphical information files (GIFs), compressed for online or world-wide-web viewing, configured for sharing via social media, formatted for standard, virtual, augmented, or other realities, compressed for transmission, storage, or otherwise, frame rate adjusted to fit a given presentation time window, such as thirty (30) seconds, one minute, or otherwise, adapted for use in commercials and/or advertisements in any media format, and otherwise.

IME Engine 202E

The sync server 102 (and/or one or more user devices 104) may execute an IME engine 202E. The IME engine 202E may facilitate selection of "matters" for IMEs. "Matter" may be selected from one or more of content data 204C, chat data 204D, consolidation data 204E, and/or IME data 20F. The matter with or without any later reactions occurring during an IME may be stored as IME data 204F.

The IME engine 202E may synchronize "matter" and later reactions using connection data 204B. Synchronization may occur using, in whole or in part, in cooperation with, by, or otherwise with the sync engine 202A.

The IME engine 202E may store, set, specify, or otherwise use one or more delay parameters that specify a delay period to use with respect to an IME or a portion thereof. The delay period may be fixed, dynamically adjusted, or otherwise specified. The delay period may arise in view of connection data 204B, content data 204C, user data 204A, and otherwise. For example, the delay period may be longer when 4K video data packets are communicated and may be shorter when textual information is communicated during an IME.

The IME engine 202E may utilize one or more of the matter designations in facilitating an IME.

The IME engine 202E, as provided on or by a user device and/or at the server, may specify a level of interactivity for a given user device on an IME. For example, a user device may indicate that the device opts out of receiving certain content, such as video content, or otherwise.

The IME engine 202E may include a synchronizer which synchronizes multiple instances of later reactions, such as each of the later reactions by the orchestral members to generate a synchronized presentation of the given musical score during an IME. For an implementation, the IME engine 202E may adjust the timing, occurrence, or otherwise of later reactions and/or segments thereof. For example, later reactions provided by an orchestral member that are irretrievably out of synch with later reactions provided by other orchestral members, may be excluded from presentation in a given IME.

The IME engine 202E may synchronize content using synchronization information provided in a media event, or other information. Such other information may be pre-existing, then generated, derived from other synchronization information, or otherwise. For example, the orchestral IME may include adjusting synchronization information associated with the primary content (the conductor's baton movements) based upon information associated with other conductors, such as famous conductor's presentation of the musical score.

The IME engine 202E may present IMEs according to one or more "experience modes." As used herein, an "IME experience mode" identifies a given user's level of interaction with primary content, prior reactions, and/or later reactions presented during an IME.

A first IME experience mode may include a view only type mode, where a given user is able to view a synchronized presentation of a matter and later reactions, but not contribute their own later reactions.

A second IME experience mode may include a prior reaction response capability where the user can respond (provide their own later reactions) to the primary content and/or prior reactions, but not respond to other user's later reactions.

A third IME experience mode may include a targeted reaction response capability where the user can respond (provide their own later reactions) to the primary content, prior reactions, and any later reactions; the prior reactions and/or later reactions originating from designated users.

A fourth IME experience mode may include a full reaction response capability where the user can respond (provide their own later reactions) to the primary content, prior reactions, and any later reactions; the prior reactions and/or later reactions originating from any user.

A fifth IME experience mode may include a content source reaction response capability where the user can respond (provide their own later reactions) to the primary content, prior reactions, and any later reactions; the prior reactions and/or later reactions originating from any user, while also providing additional content with their later reaction.

When later reactions are in response to reactions by designated users, such designated users may be identified by any entity, such as a content source, the synch server, the user device, or otherwise. User data 204A may be used in identifying content sources, types of content, users, and otherwise with respect to which a given user may provide later reactions.

The IME engine 202E may verify later reactions occur in response to a given matter or collection of matters. For an implementation, time stamps associated with later reactions may be utilized to verify the reaction corresponds to a time stamp associated with a Party, a media event, and/or a prior reaction. The IME engine 202E may utilize IME data 204F, user data 204A, chat data 204D, and/or other data, such as position data associated with a given user, to verify a given later reaction corresponds to a presentation of a given primary content and/or a prior reaction.

Although various implementations have been described above with a certain degree of particularity, or with reference to one or more individual implementations, those skilled in the art could make numerous alterations to the disclosed implementations without departing from the spirit or scope of the present disclosure. The use of the terms "approximately" or "substantially" means that a value of an element has a parameter that is expected to be close to a stated value or position. As is well known in the art, there may be minor variations that prevent the values from being exactly as stated. Accordingly, anticipated variances, such as 10% differences, are reasonable variances that a person having ordinary skill in the art would expect and know are acceptable relative to a stated or ideal goal for one or more embodiments of the present disclosure. It is also to be appreciated that the terms "top" and "bottom", "left" and "right", "up" or "down", "first", "second", "next", "last", "before", "after", and other similar terms are used for description and ease of reference purposes and are not intended to be limiting to any orientation or configuration of any elements or sequences of operations for the various embodiments of the present disclosure. Further, the terms "coupled", "connected" or otherwise are not intended to limit such interactions and communication of signals between two or more devices, systems, components or otherwise to direct interactions; indirect couplings and connections may also occur. Further, the terms "and" and "or" are not intended to be used in a limiting or expansive nature and cover any possible range of combinations of elements and operations of an implementation of the present disclosure. Other implementations are therefore contemplated. It is intended that matter contained in the above description and shown in the accompanying drawings shall be interpreted as illustrative of embodiments and not limiting. Changes in detail or structure may be made without departing from the basic elements of the present disclosure as defined in the following claims.

What is claimed is:

1. An Interactive Media Event (IME) system comprising:
a sync server;
a first user device;
a second user device; and
a third user device;
wherein the first user device, the second user device, and the third user device are communicatively coupled to the sync server by a content link;
wherein the sync server executes computer instructions instantiating a content segment engine which:
outputs, via the content link, a Party matter to a second user device and the third user device;
wherein the output, by the sync server, of the Party matter to the second user device and to the third user device are delayed, by the sync server, based on a delay parameter; and
wherein the delay parameter is dynamically determined based on an average network latency determined by the sync server based on a first network latency for the first user, a second network latency for the second user device and a third network latency for the third user device;
wherein the Party matter includes a combined and synchronized presentation of a primary content with a secondary content; and
wherein the sync server executes computer instructions instantiating an IME engine which:
receives, from the second user device, a later reaction to the Party matter; and
synchronizes the later reaction to the Party matter.

2. The IME system of claim 1,
wherein the IME engine synchronizes the later reaction with the Party matter by adjusting a timing associated with the later reaction to correspond to another timing associated with another reaction to the Party matter;
wherein the delay parameter is further determined, by the sync server, based on sync server determined latency for the content link; and
wherein the sync server further synchronizes presentation of the later reaction to the Party matter, by the first user device and the third user device, in view of the delay parameter and the determined latency for the content link such that a substantially simultaneous presentation of the Party matter with the later reaction is provided by each of the first user device, the second user device and the third user device.

3. The IME system of claim 1,
wherein the Party matter includes a media event and a prior reaction to the media event received from the first user device;
wherein the delay parameter is determined, by the sync server, based on a second user device delay; and
wherein the delay parameter varies between one-hundred milliseconds and five-hundred milliseconds.

4. The IME system of claim 3,
wherein the media event includes a primary content segment; and
wherein the media event includes synchronization information associated with the primary content segment.

5. The IME system of claim 4,
wherein the prior reaction is synchronized to the primary content segment using the synchronization information.

6. The IME system of claim 5,
wherein the later reaction is synchronized to the primary content segment using the synchronization information.

7. The IME system of claim 5,
wherein the later reaction is synchronized to the prior reaction.

8. The IME system of claim 7,
wherein the prior reaction includes chat data captured, during a Party, by the first user device; and
wherein the chat data includes at least one of a facial response and an audible response, by a first user of the first user device, to a primary content presented during the Party.

9. The IME system of claim 8,
wherein the later reaction includes second chat data captured by the second user device; and
wherein the chat data includes at least one of a facial response and an audible response to at least one of the primary content and the prior reaction.

10. The IME system of claim 1,
wherein the Party matter is associated with a consolidated watch party; and
wherein the delay parameter is determined, by the sync server, based on a second user device delay for a test content segment.

11. The IME system of claim 10,
wherein the Party matter includes a prior reaction to a segment of primary content presented during the consolidated watch party;
wherein the sync server executes computer instructions instantiating a consolidation engine which:
consolidates the segment of primary content with the prior reaction.

12. The IME system of claim 1,
wherein the Party matter includes a primary content segment and a prior reaction to the primary content segment; and
wherein the IME engine generates an IME by synchronizing the later reaction with at least one of the primary content segment and the prior reaction to the primary content segment; and
wherein the delay parameter is determined, by the sync server, based on a type of connection, a maximum available bandwidth, a throughput, and a latency for the content link.

13. The IME system of claim 1,
wherein the Party matter includes a plurality of primary content segments;

wherein the sync server executes computer instructions instantiating a consolidation engine which:
   selects a given primary content segment, from the plurality of primary content segments, based upon a first tag associated with the given primary content segment;
   selects a prior reaction to a selected given primary content segment; and
   generates the Party matter based on a selected prior reaction.

14. The IME system of claim 13,
wherein the prior reaction is tagged with the first tag.

15. The IME system of claim 14,
wherein the later reaction is tagged with the first tag.

16. The IME system of claim 15,
wherein the first tag corresponds to a matter designation and to a criteria.

17. The IME system of claim 16,
wherein the matter designation corresponds to a criteria comprising at least one of: most popular, funniest, most viewed, highest rated, best of, scariest, informative, fact verified, and source verified.

18. The IME system of claim 13,
wherein the IME engine generates an IME by synchronizing the later reaction with the selected given primary content segment and the selected prior reaction.

19. The IME system of claim 1,
wherein the sync server executes computer instructions further instantiating a consolidation engine to:
   select the Party matter from a collection of Party matters for use in generating an IME.

20. The IME system of claim 19,
wherein the Party matter includes a media event and a prior reaction to the media event received from the first user device;
wherein the media event includes a primary content segment provided by a content source;
wherein selection of the Party matter occurs based upon at least one of a first tag associated with the primary content segment and a second tag associated with the prior reaction;
wherein the first tag is provided by the content source; and
wherein the sync server executes computer instructions instantiating a consolidation engine associate the second tag with the prior reaction based upon information associated with the prior reaction.

* * * * *